United States Patent [19]

Wilson et al.

[11] Patent Number: 4,851,204
[45] Date of Patent: Jul. 25, 1989

[54] CRYSTALLINE ALUMINOPHOSPHATE COMPOSITION

[75] Inventors: Stephen Wilson, Shrub Oak; Lisa King, Putnam Valley, both of N.Y.

[73] Assignee: UOP, Des Plaines, Ill.

[21] Appl. No.: 58,122

[22] Filed: Jun. 4, 1987

[51] Int. Cl.$^4$ .............................................. C01B 25/12
[52] U.S. Cl. .................................... 425/305; 423/306; 423/118
[58] Field of Search ............... 423/305, 306, 118, 122, 423/328, 329; 502/162, 164, 208, 214

[56] References Cited

U.S. PATENT DOCUMENTS

| | | | |
|---|---|---|---|
| 4,310,440 | 1/1982 | Wilson et al. | 423/305 |
| 4,440,871 | 4/1984 | Lok et al. | 502/214 |
| 4,473,663 | 9/1984 | Patton et al. | 502/208 |
| 4,567,029 | 1/1986 | Wilson et al. | 423/306 |

OTHER PUBLICATIONS

F. D'Yvoire, Bull. Soc. Chem., France, pp. 1762–1776 (1961).

*Primary Examiner*—John Doll
*Assistant Examiner*—R. Bruce Breneman
*Attorney, Agent, or Firm*—Thomas K. McBride; Eugene I. Snyder; Frank S. Molinaro

[57] ABSTRACT

A novel crystalline aluminophosphate of the molecular sieve type, denominated AlPO$_4$—52, is prepared by hydrothermal synthesis from reactive sources of aluminum and phosphorus and an organic templating agent.

9 Claims, No Drawings

CRYSTALLINE ALUMINOPHOSPHATE COMPOSITION

FIELD OF THE INVENTION

The present invention relates in general to crystalline aluminophosphate compositions, and more particularly to a novel crystalline aluminophosphate of the molecular sieve type, and to the methods for its preparation.

BACKGROUND OF THE INVENTION

Microporous crystalline aluminophosphate compositions having open framework structures formed of $AlO_2$ and $PO_2$ tetrahedral units joined by the sharing of the corner oxygen atoms and characterized by having pore openings of uniform dimensions have heretofore been disclosed in a number of publications, notably the specification of U.S. Pat. No. 4,310,440 issued July 7, 1980 to S. T. Wilson et al. The Wilson et al. aluminophosphates constitute a generic class of non-zeolite molecular sieve materials which are capable of undergoing complete and reversible dehydration while retaining the same essential framework topology in both the anhydrous and hydrated state. By the term "essential framework topology" or "essential framework structure" as used in the aforesaid patent, and also in the present specification and claims, is meant the spatial arrangement of the primary Al—O and P—O bond linkages. Other microporous aluminophosphates which undergo structure rearrangements, either reversibly or irreversibly, upon partial or complete dehydration are also known, for example the minerals variscite and metavariscite and certain of the synthetic metastable aluminophosphates reported by F. D'Yvoire [Bull. Soc. Chim. France, 1762 (1961)]. Another class of synthetic crystalline compositions which contain framework tetrahedral metal oxides of manganese, magnesium, cobalt and/or zinc in addition to the $AlO_2$ and $PO_2$ tetrahedra are disclosed in commonly assigned U.S. Pat. No. 4,567,029, issued on Jan. 28, 1986 (MeAPO). Yet, another class of synthetic crystalline compositions which contain framework tetrahedral silicon dioxide in addition to the $AlO_2$ and $PO_2$ tetrahedra is disclosed in commonly assigned U.S. Pat. No. 4,440,871, issued on Apr. 3, 1984 (SAPO).

SUMMARY OF THE INVENTION

The present invention comprises a novel microporous crystalline aluminophosphate composition, denominated AlPO$_4$—52 and the methods for its preparation. AlPO$_4$—52 has an essential framework structure whose chemical composition, expressed in terms of mole ratios of oxides, is:

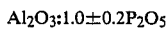

$Al_2O_3 : 1.0 \pm 0.2 P_2O_5$ and exhibits an X-ray powder diffraction pattern which contains at least the d-spacings set forth in Table I set forth hereinafter.

AlPO$_4$—52 can be prepared by hydrothermal crystallization from a reaction mixture prepared by combining reactive sources of phosphorus and aluminum with water and at least one organic structure-directing agent ("templating agent" or "template") which can include quaternary ammonium cations, preferably tetraethylammonium, and organic amines, preferably an alkyl amine, and most preferably tripropylamine. In the as-synthesized form wherein the AlPO$_4$—52 prepared by hydrothermal crystallization has not been subjected to a post-synthesis treatment effective in removing the structure directing agent, the structure directing agent is contained within the framework structure of aluminophosphate in amounts which vary per mole of $Al_2O_3$. The structure directing agent is readily removed by calcination and does not appear to be an essential constituent of the product AlPO$_4$—52.

DETAILED DESCRIPTION OF THE INVENTION

The novel microporous aluminophosphate of the present invention can be produced by hydrothermal crystallization from a reaction mixture containing reactive sources of phosphorus and aluminum and an organic templating agent, preferably tetraethylammonium hydroxide (TEAOH). The preparative process typically comprises forming a reaction mixture which in terms of molar ratios of oxides is

$Al_2O_3 : 1.0 \div 0.5 P_2O_5 : 7-100 H_2O$ and contains at least one organic templating agent, i.e., that amount which forms AlPO$_4$—52 product, e.g., about 1.0 moles of TEAOH per mole of $Al_2O_3$. Representative of the amount of organic template employed herein is an amount between about 0.2 and about 3.0 moles of organic templating agent per mole of $Al_2O_3$. The reaction mixture is placed in a reaction vessel inert toward the reaction mixture and heated at a temperature of at least about 100° C., preferably between 150°0 C. and 200° C., until crystallized, usually a period of from 2 hours to 2 weeks or more. The solid crystalline reaction product is then recovered by any convenient method, such as filtration or centrifugation, washed with water and dried in air at a temperature between ambient and about 110° C.

In a preferred crystallization method, the source of phosphorus is phosphoric acid, and the source of aluminum is a pseudo-boehmite hydrated aluminum oxide, the temperature is about 150° C., and the crystallization time is from 3 to 7 days. The preferred ratio of inorganic oxides in the reaction mixture is

$Al_2O_3 : 1.25 P_2O_5 : 40 H_2O$

In general, the most preferred reaction mixture contains, per mole of $Al_2O_3$, between 0.5 and 1.5 moles of each organic templating agent and between about 40 and 50 moles of water along with about 1.0 and 1.5 moles $P_2O_5$.

Not all templating agents suitably employed in preparation of all aluminophosphates are believed to be generally suitable for the preparation of AlPO$_4$—52. The use of tetraethylammonium hydroxide in combination with tripropylamine has been found to act as an acceptable pair of templating agents for use in the preparation of AlPO$_4$—52.

The as-synthesized AlPO$_4$—52 compositions are isolated after synthesis and advantageously washed with water. The as-synthesized AlPO$_4$—52 compositions may contain the organic templating agent within the intracrystalline pore system. The form of the organic templating agent may be an occluded molecular species (or may be present as a charge balancing cation). In general, it is desirable to remove the organic templating agent by calcination at a temperature sufficient to remove substantially all of the organic templating agent.

The calcination temperature is generally between about 300° C. and about 700° C., i.e., whereby the organic templating agent is removed by thermal degradation.

The template-containing as-synthesized form of AlPO$_4$—52 of the present invention has an essential framework structure whose chemical composition expressed in terms of mole ratios of oxides is:

$$Al_2O_3:1.0\pm0.2P_2O_5$$

and has a characteristic X-ray powder diffraction pattern which contains at least the d-spacings set forth in Table I below:

TABLE I

| 2Θ | d, (Å) | Relative Intensity |
|---|---|---|
| 8.04–8.07 | 10.96–11.0 | VS |
| 9.60–9.64 | 9.18–9.21 | S |
| 16.11–16.13 | 5.49–5.50 | M |
| 18.28–18.32 | 4.84–4.85 | M |
| 20.69–20.71 | 4.29 | VS |
| 21.80–21.82 | 4.07–4.08 | M |

In some of the X-ray patterns reported, the relative intensities of the d-spacings are indicated by the notations VS, S, M, W and VW which represent Very Strong, Strong, Medium, Weak and Very Weak, respectively.

The above X-ray patterns and all other X-ray patterns appearing hereinafter were obtained by use of either a standard X-ray powder diffraction technique or by use of computer based techniques using a Siemens D-500 X-ray powder diffractometer, available from Siemens Corporation, Cherry Hill, N.J. When the standard X-ray technique is employed the radiation source is a high-intensity, copper target, X-ray tube operated at 40 Kv and 49 ma. The diffraction pattern from the copper K-alpha radiation and graphite monochromator were recorded by an X-ray spectrometer scintillation counter, pulse height analyzer and strip chart recorder.

Flat compressed powder samples are scanned at 2 degrees (2 theta) per minute, using a two second time constant. Interplanar spacings (d) in Angstrom units are obtained from the position of the diffraction peaks expressed as $2\theta$ (theta) as observed on the strip chart where theta is the Bragg angle. Intensities were determined from the heights of diffraction peaks after subtracting background, "$I_o$" being the intensity of the strongest line or peak, and "I" being the intensity of each of the other peaks.

As will be understood by those skilled in the art the determination of the parameter 2 theta, irrespective of the technique employed, is subject to both human and mechanical error, which in combination, can impose an uncertainty of about 0.4 degree on each reported value of 2 theta. This uncertainty is of course, also manifested in the reported value of the d-spacings, which are calculated from the 2 theta values. This imprecision is general throughout the art and is not sufficient to preclude the differentiation of the present crystalline materials from the compositions of the prior art.

All of the as synthesized crystalline aluminophosphate in the form of AlPO$_4$—52 for which x-ray powder diffraction data have been obtained to date have patterns within the generalized pattern of Table II below:

TABLE II

| 2Θ | d, (Å) | Relative Intensity |
|---|---|---|
| 7.46–7.49 | 11.8–11.9 | 13 |
| 8.04–8.07 | 10.96–11.0 | 89–91 |
| 9.60–9.64 | 9.18–9.21 | 54–57 |
| 11.77–11.82 | 7.49–7.52 | 9–11 |
| 12.90–12.93 | 6.85–6.86 | 20–21 |
| 14.27–14.30 | 6.20–6.21 | 22–24 |
| 15.22–15.24 | 5.81–5.82 | 10–11 |
| 16.11–16.13 | 5.49–5.50 | 33–35 |
| 17.50–17.53 | 5.06–5.07 | 26 |
| 18.28–18.32 | 4.84–4.85 | 41–50 |
| 20.00–20.02 | 4.43–4.44 | 32–34 |
| 20.69–20.71 | 4.29 | 100 |
| 21.80–21.82 | 4.07–4.08 | 44–47 |
| 22.45–22.47 | 3.96 | 23–25 |
| 22.64–22.67 | 3.92–3.93 | 16–20 |
| 23.26–23.27 | 3.82 | 5 |
| 25.04–25.05 | 3.56 | 6 |
| 25.59–25.62 | 3.48 | 28–32 |
| 25.96–25.98 | 3.43 | 24 |
| 26.69–26.72 | 3.34 | 8 |
| 27.74–27.76 | 3.21–3.22 | 6–8 |
| 28.60–28.63 | 3.12 | 20–22 |
| 29.25–29.29 | 3.05 | 6 |
| 30.22–30.24 | 2.96 | 18 |
| 30.70–30.72 | 2.91 | 32–34 |
| 31.59–31.60 | 2.83 | 21–23 |
| 34.16–34.18 | 2.62 | 19–22 |
| 34.58 | 2.59 | 14–15 |
| 43.74 | 2.07 | 6 |
| 47.76–47.77 | 1.90 | 6 |
| 49.45–49.49 | 1.84 | 5–6 |
| 51.55–51.57 | 1.77 | 8 |

When the as-synthesized AlPO4l3 52 compositions are calcined, i.e., heated at a temperature sufficiently high (typically between about 300° C. and about 700° C.) or otherwise treated, such as by chemical oxidation, to remove essentially all of the organic templating agent present in the intracrystalline pore system, the composition has an x-ray powder diffraction pattern which contains at least the d-spacings set forth in Table III below:

TABLE III

| 2Θ | d, (Å) | 100I/Io |
|---|---|---|
| 8.01–8.16 | 10.80–11.0 | 62 |
| 9.57–9.67 | 9.14–9.24 | 100 |
| 11.7–11.8 | 7.51–7.55 | 29–44 |
| 12.9–13.0 | 6.79–6.85 | 52–54 |
| 18.1–18.2 | 4.88–4.91 | 19–26 |
| 20.7–20.8 | 4.27–4.29 | 29–32 |

The calcined crystalline aluminophosphate of the invention for which X-ray powder diffraction data have been obtained to date have patterns within the generalized pattern of Table IV below:

TABLE IV

| 2Θ | d, (Å) | 100I/Io |
|---|---|---|
| 7.48 | 11.8 | 0–6 |
| 8.01–8.16 | 10.80–11.0 | 62 |
| 9.57–9.67 | 9.14–9.24 | 100 |
| 9.87 | 8.96 | 0–10 |
| 11.5 | 7.72 | 0–11 |
| 11.70–11.8 | 7.51–7.55 | 29–44 |
| 12.90–13.0 | 6.79–6.85 | 52–54 |
| 15.3 | 5.78 | 0–7 |
| 16.10–16.2 | 5.46–5.50 | 12–13 |
| 17.50–17.6 | 5.05–5.07 | 9–10 |
| 18.10–18.2 | 4.88–4.91 | 19–26 |
| 20.1 | 4.41–4.43 | 16–17 |
| 20.70–20.8 | 4.27–4.29 | 29–32 |
| 21.1 | 4.21 | 0–8 |

TABLE IV-continued

| 2θ | d, (Å) | 100I/Io |
| --- | --- | --- |
| 21.5 | 4.13 | 0-17 |
| 21.80-21.9 | 4.06-4.07 | 21-22 |
| 22.40-22.5 | 3.96-3.97 | 8-11 |
| 22.9 | 3.88 | 0-6 |
| 23.2 | 3.83 | 0-8 |
| 25.30-25.5 | 3.50-3.52 | 10 |
| 26.00-26.1 | 3.41-3.42 | 18-24 |
| 28.20-28.4 | 3.14-3.16 | 11 |
| 28.6 | 3.12 | 0-11 |
| 28.9 | 3.09 | 0-5 |
| 29.9 | 2.99 | 0-5 |
| 30.30-30.4 | 2.94-2.95 | 9-12 |
| 30.80-39.9 | 2.90 | 15-16 |
| 31.2 | 2.87 | 7-8 |
| 31.5 | 2.84 | 11-16 |
| 31.6 | 2.83 | 0-11 |
| 33.9 | 2.64 | 0-7 |
| 34.70-34.8 | 2.58 | 7-8 |

AlPO$_4$—52 exhibits surface characteristics which make it useful as a catalyst or catalyst support in various hydrocarbon conversion and oxidative combustion processes. AlPO$_4$—52 can be associated with catalytically active metals, e.g., by impregnation, doping, pore filling and the like, by methods traditionally used in the art for the fabrication of catalyst compositions.

The present AlPO$_4$—52 composition also exhibits novel surface selectively characteristics which render it useful as a catalyst or catalyst bases in a number of hydrocarbon conversion and oxidative combustion reactions. The composition can be impregnated or otherwise loaded with catalytically active metals by methods well known in the art and used, for example, in fabricating catalysts compositions having silica or alumina bases.

Among the hydrocarbon conversion reactions that can be catalyzed by AlPO$_4$—52 composition are cracking, hydrocracking, alkylation for both the aromatic and isoparaffin types, isomerization including xylene isomerization, polymerization, reforming, hydrogenation, dehydrogenation, transalkylation, dealkylation, hydrodecyclization and dehydrocyclization.

Further, AlPO$_4$—52 has a pore size of greater than 4.3 and less than 5.0 Angstroms which makes AlPO$_4$—52 suitable for use as a molecular sieve for the separation of molecular species and shape selective catalysis.

The following examples are provided to illustrate the invention and are not to be construed as limiting thereof:

ABBREVIATIONS USED

In the following examples the AlPO$_4$—52 compositions were prepared using numerous reagents. The reagents employed and their abbreviations, if any, along with other abbreviations used are as follows:

(a) EDAX: Energy Dispersive Analysis by X-ray;
(b) LHSV: Liquid Hourly Space Velocity;
(c) LOI: Loss On Ignition;
(d) H$_3$PO$_4$: 85 weight percent aqueous phosphoric acid;
(e) Pr$_3$N: Tripropylamine;
(f) SEM: Scanning Electron Microscope;
(g) TEAOH: Aqueous solution of tetraethylammonium hydroxide; and
(h) TEFLON (polytetrafluoroethylene): is a trademark of E. I. du pont de Nemours & Co, Wilmington, DE, U.S.A.

EXAMPLE 1

(Preparation of AlPO$_4$—52)

(a) An initial solution was prepared by combining 404.9 grams of aqueous 40% tetraethylammonium hydroxide (TEAOH, C$_8$H$_{21}$NO) with 389.5 grams of water, followed by 157.8 grams of tripropylamine (Pr$_3$N, C$_9$H$_{21}$N). To the resultant solution 317.4 grams of 85% orthophosphoric acid (H$_3$PO$_4$) was added and mixed until homogeneous. To this solution 149.4 grams of a hydrated aluminum oxide (75.1 wt.% Al$_2$O$_3$, 24.9 wt.% H$_2$O, boehmite form) was added to form a reaction mixture having a composition in terms of molar oxide ratios of:

1.0TEAOH.1.0Pr$_3$N.1.0Al$_2$O$_3$.1.25P$_2$O$_5$.40H$_2$O

To this mixture 41.0 grams of AlPO$_4$—52 seed was added to form the final reaction mixture. The reaction mixture was placed in a sealed stainless steel 2 liter pressure vessel and heated at 150° C. for 120 hours with stirring. The product solids were recovered by centrifugation, washed with water, and dried in air at room temperature. A portion of the solids was subjected to X-ray and chemical analysis.

The X-ray powder diffraction pattern of the analyzed sample was characterized by the following data:

TABLE A

| 2θ | d (Å) | 100I/I$_o$ |
| --- | --- | --- |
| 7.46 | 11.80 | 13 |
| 8.04 | 11.00 | 91 |
| 9.60 | 9.21 | 54 |
| 11.8 | 7.52 | 11 |
| 12.9 | 6.86 | 20 |
| 14.3 | 6.21 | 24 |
| 15.2 | 5.82 | 11 |
| 16.1 | 5.50 | 35 |
| 17.5 | 5.07 | 26 |
| 18.3 | 4.85 | 50 |
| 20.0 | 4.44 | 34 |
| 20.7 | 4.29 | 100 |
| 21.8 | 4.08 | 47 |
| 22.4 | 3.96 | 25 |
| 22.6 | 3.93 | 20 |
| 23.3 | 3.82 | 6 |
| 25.0 | 3.56 | 6 |
| 25.6 | 3.48 | 32 |
| 26.0 | 3.43 | 24 |
| 26.7 | 3.34 | 8 |
| 27.1 | 3.30 | 4 |
| 27.2 | 3.28 | 3 |
| 27.8 | 3.22 | 6 |
| 28.6 | 3.12 | 22 |
| 29.3 | 3.05 | 6 |
| 29.8 | 3.00 | 4 |
| 30.2 | 2.96 | 18 |
| 30.7 | 2.91 | 32 |
| 31.6 | 2.83 | 23 |
| 31.9 | 2.80 | 4 |
| 33.4 | 2.68 | 3 |
| 34.2 | 2.62 | 22 |
| 34.6 | 2.59 | 15 |
| 35.1 | 2.55 | 3 |
| 36.8 | 2.44 | 3 |
| 39.4 | 2.29 | 3 |
| 39.9 | 2.26 | 3 |
| 41.0 | 2.20 | 3 |
| 41.2 | 2.19 | 3 |
| 43.7 | 2.07 | 6 |
| 46.9 | 1.94 | 2 |
| 47.4 | 1.92 | 5 |
| 47.8 | 1.90 | 6 |
| 49.5 | 1.84 | 6 |
| 50.7 | 1.80 | 5 |
| 51.2 | 1.78 | 4 |
| 51.5 | 1.77 | 8 |

TABLE A-continued

| 2Θ | d (Å) | 100I/I$_o$ |
|---|---|---|
| 53.4 | 1.72 | 5 |
| 54.0 | 1.70 | 2 |
| 55.1 | 1.67 | 3 |

The chemical composition was found to be 29.2 wt% Al$_2$O$_3$, 49.2 wt% P$_2$O$_5$, 11.5 wt% C, 1.8 wt% N, and 22.6 wt.% LOI. Expressed in terms of molar oxide ratios (anhydrous basis), the composition was:

0.35TEAOH.0.83Al$_2$O$_3$.1.00P$_2$O$_5$ which corresponds to an empirical chemical composition of:

0.09 TEAOH.(Al$_{0.45}$P$_{0.55}$)O$_2$ (b) A portion of the solids from part (a) supra was calcined at 600° C. for 5 hours, and then subjected to X-ray analysis. The X-ray powder diffraction pattern was characterized by the following data:

TABLE B

| 2Θ | d (Å) | 100I/I$_o$ |
|---|---|---|
| 7.48 | 11.80 | 6 |
| 8.01 | 11.00 | 62 |
| 9.57 | 9.24 | 100 |
| 9.87 | 8.96 | 10 |
| 11.5 | 7.72 | 11 |
| 11.7 | 7.55 | 29 |
| 12.9 | 6.85 | 52 |
| 16.1 | 5.50 | 12 |
| 17.5 | 5.07 | 9 |
| 18.2 | 4.88 | 19 |
| 20.1 | 4.43 | 16 |
| 20.7 | 4.29 | 29 |
| 21.1 | 4.21 | 8 |
| 21.5 | 4.13 | 17 |
| 21.8 | 4.07 | 22 |
| 22.5 | 3.96 | 11 |
| 22.9 | 3.88 | 6 |
| 23.2 | 3.83 | 8 |
| 25.5 | 3.50 | 10 |
| 26.0 | 3.42 | 24 |
| 28.4 | 3.14 | 11 |
| 28.6 | 3.12 | 11 |
| 28.9 | 3.09 | 5 |
| 29.9 | 2.99 | 5 |
| 30.3 | 2.95 | 12 |
| 30.8 | 2.90 | 15 |
| 31.2 | 2.87 | 8 |
| 31.5 | 2.84 | 16 |
| 34.7 | 2.58 | 7 |

(c) A portion of the solids from part (a) supra was calcined under nitrogen to 600° C. and cooled down to 25° C. under nitrogen. The X-ray powder pattern was characterized by the following data:

TABLE C

| 2Θ | d (Å) | 100I/I$_o$ |
|---|---|---|
| 8.16 | 10.80 | 62 |
| 9.67 | 9.14 | 100 |
| 11.8 | 7.51 | 44 |
| 13.0 | 6.79 | 54 |
| 15.3 | 5.78 | 7 |
| 16.2 | 5.46 | 13 |
| 17.6 | 5.05 | 10 |
| 18.1 | 4.91 | 26 |
| 20.1 | 4.41 | 17 |
| 20.8 | 4.27 | 32 |
| 21.9 | 4.06 | 21 |
| 22.4 | 3.97 | 8 |
| 25.3 | 3.52 | 10 |

TABLE C-continued

| 2Θ | d (Å) | 100I/I$_o$ |
|---|---|---|
| 26.1 | 3.41 | 18 |
| 28.2 | 3.16 | 11 |
| 30.4 | 2.94 | 9 |
| 30.9 | 2.90 | 16 |
| 31.2 | 2.87 | 7 |
| 31.5 | 2.84 | 11 |
| 31.6 | 2.83 | 11 |
| 33.9 | 2.64 | 7 |
| 34.8 | 2.58 | 8 |

(d) A portion of the calcined material of part (b) supra and a portion of the as-synthesized material from part (a) supra were each evaluated for adsorption capacity using a standard McBain-Bakr adsorption apparatus. Both samples were activated at 400° C. under vacuum prior to the first measurement, and subsequently activated at b 350°–400° C. prior to each new adsorbate. These samples are designated 1 and 2, respectively, in the following data:

| Adsorbate | Kinetic Diameter, Θ | Pressure Torr | Temp., °C. | Wt % Adsorbed (1) | (2) |
|---|---|---|---|---|---|
| O$_2$ | 3.46 | 102 | −183.0 | 19.5 | 24.5 |
|  |  | 700 | −183.0 | 23.7 | 30.1 |
| H$_2$O | 2.65 | 4.6 | 23 | 26.5 | 30.8 |
|  |  | 19.5 | 23 | 35.2 | 37.9 |
| n-Butane | 4.3 | 700 | 23 | 5.1* | 12.9* |
| Isobutane | 5.0 | 700 | 23 | 0.04 | 0.5 |

*Samples failed to reach equilibrium.

The adsorption of n-butane and the exclusion of isobutane indicates a pore size for the calcined or heat treated AlPO$_4$—52 of greater than 4.3 Å and less than 5.0 Å.

EXAMPLE 2

(Preparation of AlPO$_4$—52)

A reaction mixture having a composition expressed in molar oxide ratios of:

1.0TEAOH.1.0Pr$_3$N.1.0Al$_2$O$_3$.1.25P$_2$O$_5$.40H$_2$O plus 5 wt% AlPO$_4$—18 seed was prepared as follows:

A solution was prepared by combining 404.8 grams of 40% aqueous tetraethylammonium hydroxide (TEAOH) with 390.0 grams of water, followed by 157.7 grams of tripropylamine (Pr$_3$N) and 317.4 grams of 85% orthophosphoric acid (H$_3$PO$_4$). This solution was then mixed with 149.4 grams of a hydrated aluminum oxide (75.1 wt.% Al$_2$O$_3$, 24.9 wt.% H$_2$O, a boehmite form) and to the resulting mixture was added 10 wt% AlPO$_4$—18 seed (See U.S. Pat. No. 4,310,440). The reaction mixture was placed in a sealed 2 liter stainless steel pressure vessel and heated at 150° C. for 120 hours with stirring. The solids were recovered by centrifugation, washed with water and dried at room temperature. By X-ray analysis, the solids were found to be predominantly AlPO$_4$—52 with a small amount of impurity. The AlPO$_4$—52 constituent had a powder diffraction pattern essentially the same as in Table A and the specific powder diffraction pattern obtained are disclosed in Table D:

TABLE D

| 2Θ | d (Å) | 100I/I₀ |
|---|---|---|
| 7.49 | 11.80 | 13 |
| 8.07 | 10.96 | 89 |
| 9.64 | 9.18 | 57 |
| 11.8 | 7.49 | 9 |
| 12.9 | 6.85 | 21 |
| 14.3 | 6.19 | 22 |
| 15.2 | 5.81 | 10 |
| 16.1 | 5.49 | 33 |
| 17.5 | 5.06 | 26 |
| 18.3 | 4.84 | 41 |
| 20.0 | 4.43 | 32 |
| 20.7 | 4.29 | 100 |
| 21.8 | 4.07 | 44 |
| 22.5 | 3.96 | 23 |
| 22.7 | 3.92 | 16 |
| 23.3 | 3.82 | 5 |
| 25.0 | 3.56 | 6 |
| 25.6 | 3.48 | 28 |
| 26.0 | 3.43 | 24 |
| 26.7 | 3.34 | 8 |
| 27.8 | 3.21 | 8 |
| 28.6 | 3.12 | 20 |
| 29.3 | 3.05 | 6 |
| 30.2 | 2.96 | 18 |
| 30.7 | 2.91 | 34 |
| 31.6 | 2.83 | 21 |
| 34.2 | 2.62 | 19 |
| 34.6 | 2.59 | 14 |
| 43.7 | 2.07 | 6 |
| 47.8 | 1.90 | 6 |
| 49.5 | 1.84 | 5 |
| 51.6 | 1.77 | 8 |

A portion of the sample was also subjected to chemical analysis which showed 25.9 wt% $Al_2O_3$, 41.1 wt% $P_2O_5$, 10.7 wt% C, and 1.5 wt% N, and 33.7 wt.% LOI giving a product composition in molar oxide ratios (anhydrous basis) of:

$$0.38 TEAOH \cdot 0.88 Al_2O_3 \cdot 1.00 P_2O_5$$

which corresponds to an empirical composition of:

$$0.10 TEAOH \cdot (Al_{0.47}P_{0.53})O_2$$

The as synthesized AlPO₄—52 samples prepared to date exhibit X-ray diffraction data which fall within the range of the general table that follows:

GENERAL X-RAY (SHORT) TABLE FOR AlPO₄-52

| 2Θ | d (Å) | 100I/I₀ | |
|---|---|---|---|
| 8.04–8.07 | 10.96–11.0 | 89–91 | VS |
| 9.60–9.64 | 9.18–9.21 | 54–57 | S |
| 16.11–16.13 | 5.49–5.50 | 33–35 | M |
| 18.28–18.32 | 4.84–4.85 | 41–50 | M |
| 20.69–20.71 | 4.29 | 100 | VS |
| 21.80–21.82 | 4.07–4.08 | 44–47 | M |

GENERAL X-RAY (LONG) TABLE FOR AlPO₄-52

| 2Θ | d (Å) | 100I/I₀ |
|---|---|---|
| 7.46–7.49 | 11.80–11.9 | 13 |
| 8.04–8.07 | 10.96–11.0 | 89–91 |
| 9.60–9.64 | 9.18–9.21 | 54–57 |
| 11.77–11.82 | 7.49–7.52 | 9–11 |
| 12.90–12.93 | 6.85–6.86 | 20–21 |
| 14.27–14.30 | 6.20–6.21 | 22–24 |
| 15.22–15.24 | 5.81–5.82 | 10–11 |
| 16.11–16.13 | 5.49–5.50 | 33–35 |
| 17.50–17.53 | 5.06–5.07 | 26 |
| 18.28–18.32 | 4.84–4.85 | 41–50 |
| 20.00–20.02 | 4.43–4.44 | 32–34 |
| 20.69–20.71 | 4.29 | 100 |
| 21.80–21.82 | 4.07–4.08 | 44–47 |
| 22.45–22.47 | 3.96 | 23–25 |
| 22.64–22.67 | 3.92–3.93 | 16–20 |
| 23.26–23.27 | 3.82 | 5 |
| 25.04–25.05 | 3.56 | 6 |
| 25.59–25.62 | 3.48 | 28–32 |
| 25.96–25.98 | 3.43 | 24 |
| 26.69–26.72 | 3.34 | 8 |
| 27.74–27.76 | 3.21–3.22 | 6–8 |
| 28.60–28.63 | 3.12 | 20–22 |
| 29.25–29.29 | 3.05 | 6 |
| 30.22–30.24 | 2.96 | 18 |
| 30.70–30.72 | 2.91 | 32–34 |
| 31.59–31.60 | 2.83 | 21–23 |
| 34.16–34.18 | 2.62 | 19–22 |
| 34.58 | 2.59 | 14–15 |
| 43.74 | 2.07 | 6 |
| 47.76–47.77 | 1.90 | 6 |
| 49.45–49.49 | 1.84 | 5–6 |
| 51.55–51.57 | 1.77 | 8 |

What is claimed is:

1. Microporous crystalline aluminophosphate composition having an essential framework structure whose chemical composition expressed in terms of mole ratios of oxides is $$Al_2O_3 : 1.0 \pm 0.2 P_2O_5$$

and having a characteristic X-ray powder diffraction pattern containing at least the following d-spacings

| 2Θ | d (Å) | 100I/I₀ | |
|---|---|---|---|
| 8.04 – 8.07 | 10.96 – 11.0 | 89 – 91 | VS |
| 9.60 – 9.64 | 9.18 – 9.21 | 54–57 | S |
| 16.11 – 16.13 | 5.49 – 5.50 | 33–35 | M |
| 18.28 – 18.32 | 4.84 – 4.85 | 41–50 | M |
| 20.69 – 20.71 | 4.29 | 100 | VS |
| 21.80 – 21.82 | 4.07 – 4.08 | 44–47 | M | and an absence of characterizing peaks at the following d-spacings: 6.68–6.56 and 5.77–5.68 Angstroms.

2. Microporous crystalline aluminophosphate composition having an essential framework structure whose chemical composition expressed in terms of mole ratios of oxides is $$Al_2O_3 : 1.0 \pm 0.2 P_2O_5$$

and having a characteristic X-ray powder diffraction pattern containing at least the d-spacings as set forth in Table II

TABLE II

| 2Θ | d (Å) | Relative Intensity |
|---|---|---|
| 7.46–7.49 | 11.8–11.9 | 13 |
| 8.04–8.07 | 10.96–11.0 | 89–91 |
| 9.60–9.64 | 9.18–9.21 | 54–57 |
| 11.77–11.82 | 7.49–7.52 | 9–11 |
| 12.90–12.93 | 6.85–6.86 | 20–21 |
| 14.27–14.30 | 6.20–6.21 | 22–24 |
| 15.22–15.24 | 5.81–5.82 | 10–11 |
| 16.11–16.13 | 5.49–5.50 | 33–35 |
| 17.50–17.53 | 5.06–5.07 | 26 |
| 18.28–18.32 | 4.84–4.85 | 41–50 |
| 20.00–20.02 | 4.43–4.44 | 32–34 |
| 20.69–20.71 | 4.29 | 100 |
| 21.80–21.82 | 4.07–4.08 | 44–47 |
| 22.45–22.47 | 3.96 | 23–25 |
| 22.64–22.67 | 3.92–3.93 | 16–20 |
| 23.26–23.27 | 3.82 | 5 |
| 25.04–25.05 | 3.56 | 6 |
| 25.59–25.62 | 3.48 | 28–32 |
| 25.96–25.98 | 3.43 | 24 |
| 26.69–26.72 | 3.34 | 8 |
| 27.74–27.76 | 3.21–3.22 | 6–8 |
| 28.60–28.63 | 3.12 | 20–22 |

TABLE II-continued

| 2Θ | d (Å) | Relative Intensity |
|---|---|---|
| 29.25–29.29 | 3.05 | 6 |
| 30.22–30.24 | 2.96 | 28 |
| 30.70–30.72 | 2.91 | 32–34 |
| 31.59–31.60 | 2.83 | 21–23 |
| 34.16–34.18 | 2.62 | 19–22 |
| 34.58 | 2.59 | 14–15 |
| 43.74 | 2.07 | 6 |
| 47.76–47.77 | 1.90 | 6 |
| 49.45–49.49 | 1.84 | 5–6 |
| 51.55–51.57 | 1.77 | 8 | and an absence of characterizing peaks at the following d-spacings: 6.68–6.56 and 5.77–5.68 Angstroms.

3. A calcined microporous crystalline aluminophosphate composition of claim 1.

4. Microporous crystalline aluminophosphate composition having an essential framework structure whose chemical composition expressed in terms of mole ratios of oxide is $Al_2O_3:1.0\pm0.2P_2O_5$ and having a characteristic X-ray powder diffraction pattern containing at least the d-spacings as set forth in Table III

TABLE III

| 2Θ | d (Å) | Relative Intensity |
|---|---|---|
| 8.01–8.16 | 10.80–11.0 | 62 |
| 9.57–9.67 | 9.14–9.24 | 100 |
| 11.7–11.8 | 7.51–7.55 | 29–44 |
| 12.9–13.0 | 6.79–6.85 | 52–54 |
| 18.1–18.2 | 4.88–4.91 | 19–26 |
| 20.7–20.8 | 4.27–4.29 | 29–32 | and an absence of characterizing peaks at the following d-spacings: 6.68–6.56 and 5.77–5.68 Angstroms.

5. Microporous crystalline aluminophosphate composition having an essential framework structure whose chemical composition expressed in terms of mole ratios of oxides is $Al_2O_3:1.0\pm0.2P_2O_5$ and having a characteristic X-ray powder diffraction pattern containing at least the d-spacings as set forth in Table IV

TABLE IV

| 2Θ | d (Å) | Relative Intensity |
|---|---|---|
| 7.48 | 11.8 | 0–6 |
| 8.01–8.16 | 10.80–11.0 | 62 |
| 9.57–9.67 | 9.14–9.24 | 100 |
| 9.87 | 8.96 | 0–10 |
| 11.5 | 7.72 | 0–11 |
| 11.70–11.8 | 7.51–7.55 | 29–44 |
| 12.90–13.0 | 6.79–6.85 | 52–54 |
| 15.3 | 5.78 | 0–7 |
| 16.10–16.2 | 5.46–5.50 | 12–13 |
| 17.50–17.6 | 5.05–5.07 | 9–10 |
| 18.10–18.2 | 4.88–4.91 | 19–26 |
| 20.1 | 4.41–4.43 | 16–17 |
| 20.70–20.8 | 4.27–4.29 | 29–32 |
| 21.1 | 4.21 | 0–8 |
| 21.5 | 4.13 | 0–17 |
| 21.80–21.9 | 4.06–4.07 | 21–22 |
| 22.40–22.5 | 3.96–3.97 | 8–11 |
| 22.9 | 3.88 | 0–6 |
| 23.2 | 3.83 | 0–8 |
| 25.30–25.5 | 3.50–3.52 | 10 |
| 26.00–26.1 | 3.41–3.42 | 18–24 |

TABLE IV-continued

| 2Θ | d (Å) | Relative Intensity |
|---|---|---|
| 28.20–28.4 | 3.14–3.16 | 11 |
| 28.6 | 3.12 | 0–11 |
| 28.9 | 3.09 | 0–5 |
| 29.9 | 2.99 | 0–5 |
| 30.30–30.4 | 2.94–2.95 | 9–12 |
| 30.80–39.9 | 2.90 | 15–16 |
| 31.2 | 2.87 | 7–8 |
| 31.5 | 2.84 | 11–16 |
| 31.6 | 2.83 | 0–11 |
| 33.9 | 2.64 | 0–7 |
| 34.70–34.8 | 2.58 | 7–8 | and an absence of characterizing peaks at the following d-spacings: 6.68–6.56 and 5.77–5.68 Angstroms.

6. Process for preparing a microporous crystalline aluminophosphate composition having framework structure formed of $AlO_2$ and $PO_2$ units whose chemical composition expressed in terms of mole ratios of oxides is $Al_2O_3:1.0\pm0.2P_2O_5$ and having a characteristic X-ray powder diffraction pattern containing at least the following d-spacings

| 2Θ | d (Å) | Relative Intensity | |
|---|---|---|---|
| 8.04–8.07 | 10.96–11.0 | 89–91 | VS |
| 9.60–9.64 | 9.18–9.21 | 54–57 | S |
| 16.11–16.13 | 5.49–5.50 | 33–35 | M |
| 18.28–18.32 | 4.84–4.85 | 41–50 | M |
| 20.69–20.71 | 4.29 | 100 | VS |
| 21.80–21.82 | 4.07–4.08 | 44–47 | M | and an absence of characterizing peaks at the following d-spacings: 6.68–6.56 and 5.77–5.68 Angstroms which process comprises forming a reaction mixture having a composition comprising $Al_2O_3$, and at least one mole of phosphorus source (calculated as $P_2O_5$) per mole of $Al_2O_3$, and organic templating agent comprising tetraethylammonium hydroxide and tripropylamine wherein each is present in an amount of about 0.5 to 1.5 moles per mole of $Al_2O_3$ to provide the microporous crystalline aluminophosphate composition in the presence of sufficient water to form a reaction mixture, and providing the mixture at a temperature and time sufficient to form crystals of said aluminophosphate composition.

7. Process for preparing a microporous crystalline aluminophosphate composition having framework structure formed of $AlO_2$ and $PO_2$ units whose chemical composition expressed in terms of mole ratios of oxides is $Al_2O_3:1.0\pm0.2P_2O_5$ and having a characteristic X-ray powder diffraction pattern containing at least the following d-spacings

| 2Θ | d (Å) | Relative Intensity | |
|---|---|---|---|
| 8.04–8.07 | 10.96–11.0 | 89–91 | VS |
| 9.60–9.64 | 9.18–9.21 | 54–57 | S |
| 16.11–16.13 | 5.49–5.50 | 33–35 | M |
| 18.28–18.32 | 4.84–4.85 | 41–50 | M |
| 20.69–20.71 | 4.29 | 100 | VS |
| 21.80–21.82 | 4.07–4.08 | 44–47 | M | and an absence of characterizing peaks at the following d-spacings: 6.68–6.56 and 5.77–5.68 Angstroms which process comprises forming a reaction mixture having a composition comprising $Al_2O_3$, organic templating agent comprising tetraethylammonium hydroxide and tripropylamine wherein each is present in an amount of about 0.5 to 1.5 moles per mole of $Al_2O_3$ and between about 40 and about 50 moles of water per mole of $Al_2O_3$ along with from about 1.0 to about 1.5 moles of $P_2O_5$ per mole of $Al_2O_3$, and heating the reaction mixture thus formed at a temperature of at least about 100° C. to about 200° C. under autogeneous pressure until crystals of said aluminophosphate are formed.

8. Process for preparing a microporous crystalline aluminophosphate composition according to claim 6 wherein an additional step comprises seeding the mixture with an $AlPO_4$—18 seed.

9. Process for preparing a microporous crystalline aluminophosphate composition according to claim 6 wherein an additional step comprises seeding the mixture with an $AlPO_4$—52 seed.

* * * * *